(12) United States Patent
Furre et al.

(10) Patent No.: US 11,357,152 B2
(45) Date of Patent: Jun. 14, 2022

(54) QUICK-FIT COUPLING FOR A WEARING PART OF A SOIL-WORKING TOOL

(71) Applicant: KVERNELAND GROUP OPERATIONS NORWAY AS, Klepp Stasjon (NO)

(72) Inventors: Arnold Furre, Sandnes (NO); Erlend Sølvberg, Kvernaland (NO); Øyvind Egeland, Kvelde (NO)

(73) Assignee: KVERNELAND GROUP OPERATIONS NORWAY AS, Klepp Stasjon (NO)

( * ) Notice: Subject to any disclaimer, the term of this patent is extended or adjusted under 35 U.S.C. 154(b) by 71 days.

(21) Appl. No.: 16/762,191

(22) PCT Filed: Nov. 7, 2018

(86) PCT No.: PCT/NO2018/050267
§ 371 (c)(1),
(2) Date: May 7, 2020

(87) PCT Pub. No.: WO2019/093902
PCT Pub. Date: May 16, 2019

(65) Prior Publication Data
US 2020/0352078 A1    Nov. 12, 2020

(30) Foreign Application Priority Data
Nov. 8, 2017    (EP) ..................................... 17200596

(51) Int. Cl.
*A01B 35/22*    (2006.01)
(52) U.S. Cl.
CPC ................................. *A01B 35/225* (2013.01)

(58) Field of Classification Search
CPC ....... A01D 15/06; A01D 23/02; E02F 9/2808; E02F 9/2825; E02F 9/2858; A01B 35/225; A01B 35/22
See application file for complete search history.

(56) References Cited

U.S. PATENT DOCUMENTS

| 1,807,998 A | 6/1931 | McCord |
| 3,013,620 A | 12/1961 | Hill |

(Continued)

FOREIGN PATENT DOCUMENTS

| EP | 1 259 105 B1 | 11/2002 |
| WO | WO 2013/176551 A1 | 11/2013 |

OTHER PUBLICATIONS

Extended European Search Report, Application No. 17200596.9, dated Apr. 25, 2018, 10 pages.

(Continued)

*Primary Examiner* — Jessica H Lutz
(74) *Attorney, Agent, or Firm* — Foley & Lardner LLP

(57) ABSTRACT

A wearing part arrangement (1) provided with a holder (11) providing releasable attachment of a wearing part (12) by means of a socket-and-pin type quick-fit coupling, wherein the holder (11) comprises a pair of opposing first guide portions (1132) being arranged to face corresponding supporting faces (1221) provided on the wearing part (12), and a pair of second guide portions (1134) arranged to face corresponding top faces (1223) of the wearing part (12), wherein one of the pair of the opposing first guide portions (1132) and the corresponding side supporting faces (1221) of the wearing part (12) is provided with at least one elevation (1222), and the other one of the pair of the opposing first guide portions (1132) and the corresponding side supporting faces (1221) is provided with a corresponding recess (1135) arranged for receipt of the elevation (1222)

(Continued)

when the wearing part (12) is in engagement with the holder (11).

10 Claims, 3 Drawing Sheets

(56) References Cited

U.S. PATENT DOCUMENTS

| | | | |
|---|---|---|---|
| 3,136,077 A * | 6/1964 | Troeppl | E02F 9/28 |
| | | | 37/452 |
| 4,976,566 A | 12/1990 | Yeomans | |
| 9,485,897 B2 * | 11/2016 | Skjæveland | E02F 9/2858 |
| 9,603,296 B2 * | 3/2017 | Skjaeveland | A01B 15/06 |
| 10,111,371 B2 * | 10/2018 | Skjæveland | A01B 15/06 |
| 10,130,021 B2 * | 11/2018 | Skjæveland | A01B 23/02 |
| 10,287,752 B2 * | 5/2019 | Skjæveland | A01B 15/06 |
| 2004/0256121 A1 | 12/2004 | Pollard | |
| 2007/0193075 A1 | 8/2007 | Carpenter | |
| 2012/0279096 A1 * | 11/2012 | Skjæveland | E02F 9/2858 |
| | | | 37/455 |
| 2013/0086827 A1 | 4/2013 | Renski et al. | |
| 2016/0255757 A1 * | 9/2016 | Skjæveland | A01B 23/02 |

OTHER PUBLICATIONS

International Preliminary Report on Patentability, PCT/NO2018/050267, dated Oct. 9, 2019, 5 pages.

* cited by examiner

QUICK-FIT COUPLING FOR A WEARING PART OF A SOIL-WORKING TOOL

The invention concerns a wearing part arrangement provided with a holder attachable to a supporting surface arranged at a leading edge of an implement, the holder providing releasable attachment of a wearing part by means of a socket-and-pin type quick-fit coupling, wherein the holder comprises a pair of opposing first guide portions providing lateral support to the wearing part, being arranged to face corresponding supporting faces provided on the wearing part, and a pair of second guide portions facing the supporting surface of the implement and providing vertical support to the wearing part, being arranged to face corresponding top faces of the wearing part.

From an implement that is provided with a cutting edge, an edge, a tine, tooth or the like arranged to work against and move an unconsolidated mass, it is known to use replaceable wearing parts to increase the durability of the portion/portions that is/are subjected to heavy wear. The applicant's own patent publication EP 1259105 discloses such a wearing part for mounting on a leading edge of an implement, a holder being arranged on the implement and forming at least a portion of the leading edge, and the wearing part being provided with cooperating guide elements forming a slidable fit of a socket-and-projection type for quick replacement of the wearing part without the use of fasteners or means other than a striking tool.

WO 2013/176551 discloses a wearing-part arrangement comprising holder and a replaceable wearing part to be attached to the holder, the holder being received and secured on a supporting surface at a leading edge of an implement, wherein the holder and the wearing part are provided with corresponding attachment projection and socket, respectively comprising cooperating guide portions, the guide portions of the holder being formed as guide faces facing the supporting surface and being slanted relative to the supporting surface, falling in a direction away from the leading edge, wherein the wearing part includes one or more abutment portions which, when the wearing part is fixed in the holder, rest supportingly against the supporting surface.

These wearing-part arrangements are widely known as quick-fit or knock-on wearing-part systems.

There are challenges related to cracking due to high stresses being introduced during assembly and daily work of the these quick-fit wearing-part systems.

The invention has for its object to remedy or to reduce at least one of the drawbacks of the prior art, or at least provide a useful alternative to prior art.

The object is achieved through features, which are specified in the description below and in the claims that follow.

In what follows, unless something else is expressly mentioned, the term "length" is to be understood as the extent of an element in the operative moving direction of a wearing part when the wearing part is arranged on the leading edge of an implement, possibly the extent of an axis lying in a plane coinciding with said moving direction and a supporting surface on which the wearing part is attached. Unless something else is expressly mentioned, the term "width" is then to be understood as the extent of the element transversal to the operative moving direction of the wearing part and parallel with said supporting surface. Unless something else is explicitly mentioned, the term "height" is then understood as the extent of the element up from a plane coinciding with said supporting surface on which the wearing part is attached.

In what follows, unless something else is expressly mentioned, the terms "forward", "rear" and the like are related to the operative moving direction of the wearing part when the wearing part is arranged on the leading edge of the implement.

For a leading edge of an implement which is provided with a cutting edge, typically a ploughshare, a cultivator tine or a front portion of a loader bucket (also called a bucket jaw) or the like arranged to work against and move an unconsolidated mass, a new invention in the form of a wearing-part arrangement is provided, said wearing-part arrangement comprising a replaceable wearing part arranged for releasable quick-fit attachment to a holder provided on a supporting surface of the implement adjacent the leading edge, wherein said wearing part and holder are provided with cooperating guide portions which, in a projection perpendicular to the supporting surface, extend substantially in the operative moving direction of the implement.

The wearing part and the holder are connected by means of a socket-and-pin type quick-fit coupling as the wearing part may be driven into engagement with the holder by means of a force that acts substantially in the longitudinal direction of the guide portion, for example by the use of a striking tool, to take a correct working position without fasteners in the form of screws, bolts or the like being used. The socket is arranged for surrounding a tip portion of the pin and at least adjacent portions of the neighbouring side faces of the pin. One of the wearing part and the holder is provided with the socket, and the other one of the wearing part and the socket is provided with the pin. In a preferred embodiment, the wearing part is forming the socket and the holder is forming the pin.

The one of the socket and the pin provided on the holder is arranged with opposing holder side faces constituting guide portions arranged for laterally supporting corresponding wearing-part side supporting faces of the other one of the socket and the pin provided on the wearing part. The socket and the pin are preferable mirror-symmetrical about a vertical plane coinciding with a centre axis of the wearing-part arrangement. The holder side faces and the corresponding wearing-part side supporting faces are preferably parallel in their longitudinal direction. Furthermore, the holder side faces and the corresponding wearing-part side supporting faces may be parallel in their transversal direction, preferably standing at right angles at bottom faces of the holder and the wearing part. Said holder side faces are upwards defined by top support portions extending from the holder side faces and arranged for projecting in over corresponding wearing-part top faces. The height of the holder side faces is preferably decreasing in a rearward direction, the thickness of the top support portions extending from the holder side faces gradually extending towards a rear portion of the holder side faces, thereby providing improved strength to take the strain gradually extending towards the rear of the holder.

At least one elevation is protruding from one of the holder side faces and the corresponding wearing-part supporting faces, and the other one of the holder side faces and the corresponding wearing-part supporting faces is provided with a corresponding at least one recess arranged for receipt of said at least one elevation. By engagement of the elevations in the recesses the socket and the pin forms a connection of the wearing part to the holder engageable and releasable by applying a force substantially in the longitudinal direction of the guide portion, for example by the use of a striking tool.

Each of the recesses are preferably provided with an open end allowing the wearing part and the holder to be joined in a sliding movement of the wearing part in a direction from below towards the bottom surface of the holder prior to attaching the assembled wearing-part arrangement to the supporting surface of the implement by means of bolts or the like.

In a preferred embodiment, rear transition portion of the top support portions defining the holder side faces are also defining the rear end of the holder side faces, thus shielding the holder side faces and the corresponding wearing-part side supporting faces from intrusion of soil etc., and also increasing the strength of the holder by increasing the cross-sectional area of the holder.

The dimensions of the pin and the socket elements are preferably adapted to allow attachment of the wearing part to the holder in a loose fit, thereby avoiding applying considerable lateral forces to the socket after assembly, unlike a tight fit, frictional attachment according to prior art.

The present invention provides simplified manufacturing. Less thickness of the rear portion of the wearing-part arrangement improves the flow of soil, and the assembly of the wearing-part arrangement is eased due to the sliding joining of holder and wearing part prior to attaching the arrangement on the implement.

The invention is defined by the independent patent claim. The dependent claims define advantageous embodiments of the invention.

More specifically, the invention relates to a wearing part arrangement provided with a holder attachable to a supporting surface of an implement provided with a leading edge, the holder providing releasable attachment of a wearing part by means of a socket-and-pin type quick-fit coupling, the wearing part protecting the leading edge from excessive wear, wherein the holder comprises a pair of opposing first guide portions providing lateral support to the wearing part, being arranged to face corresponding supporting faces provided on the wearing part, and a pair of second guide portions facing the supporting surface and providing vertical support to the wearing part, being arranged to face corresponding top faces of the wearing part, and a wearing part bottom surface restingly abutting the supporting surface of the implement, characterised in that one of the pair of the opposing first guide portions and the corresponding side supporting faces of the wearing part are provided with at least one elevation, and the other one of the pair of the opposing first guide portions and the corresponding side supporting faces are provided with a corresponding recess arranged for receipt of the elevation when the wearing part is in engagement with the holder.

The holder may form an attachment pin, and the wearing part may form a corresponding attachment socket configured to surround a tip portion of the pin and at least adjacent portions of neighbouring side faces of the pin.

The first guide portions of the holder and the corresponding side supporting faces of the wearing part may be provided with parallel longitudinal axes.

The first guide portions of the holder and the corresponding side supporting faces of the wearing part may be provided with parallel transversal axes.

The first guide portions of the holder and the corresponding side supporting faces of the wearing part may be provided with parallel transversal axes standing at right angles at bottom faces of the holder and the wearing part, respectively.

The first guide portions may be provided with a gradually decreasing height towards a rear end portion of first guide portions.

A thickness of top support portions forming the second guide portions and extending from the first guide portions of the holder may extend towards a rear end portion of first guide portions.

The recess may be provided with at least one open end arranged for allowing a corresponding elevation to enter said recess when slidingly moving the wearing part towards a holder bottom surface to engagement with the holder prior to attaching the wearing part arrangement to the supporting surface.

The recesses may be provided at rear end portions of the holder side faces.

The pin and the socket may be mirror-symmetrical about a vertical plane coinciding with a centre axis of the wearing part arrangement.

The sizes of the pin and the socket may be set according to a relevant ISO tolerance for forged or cast components.

In the following is described an example of a preferred embodiment illustrated in the accompanying drawings, wherein.

In what follows, reference being made to the drawings, preferred exemplary embodiments of a replaceable wearing part according to the invention will now be described, adapted for mounting on an implement with one or more working, leading edges or fronts which are arranged to work in a specific material and which are subjected to wear over time.

The preferred exemplary embodiment that is described is connected to agricultural implements for use in agricultural operations, but it will be understood that the invention has a wider application as it may be used on replaceable working shares of a kind known per se, and for other types and combinations of work tools that require replaceable working shares to be fitted thereon, fixed by a holder, whose lifetime should desirably be extended.

Figure 1:
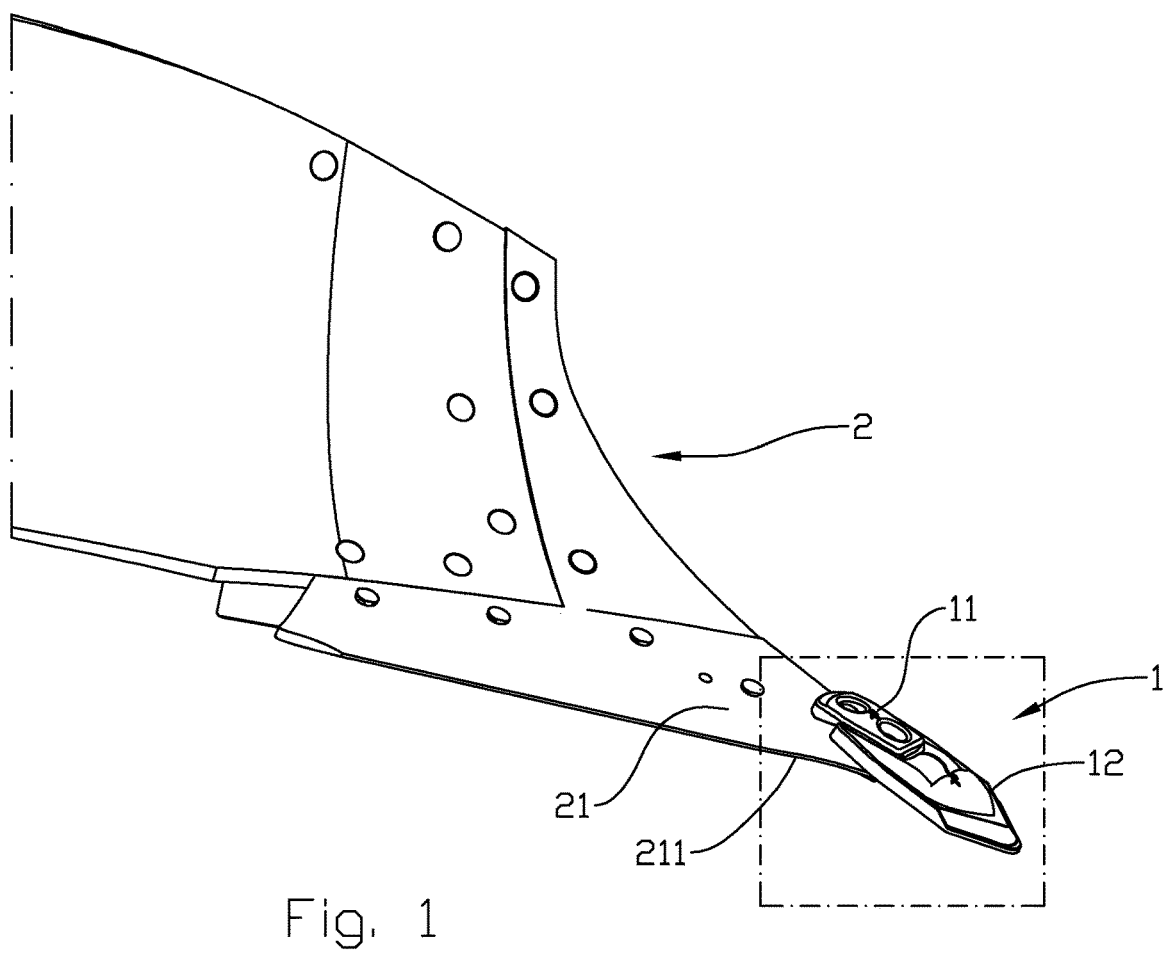
FIG. 1 depicts a section of a mouldboard plough, wherein a ploughshare is provided with a wearing-part arrangement provided with a socket-and-pin quick-fit coupling according to the present invention.
Figure 1A:
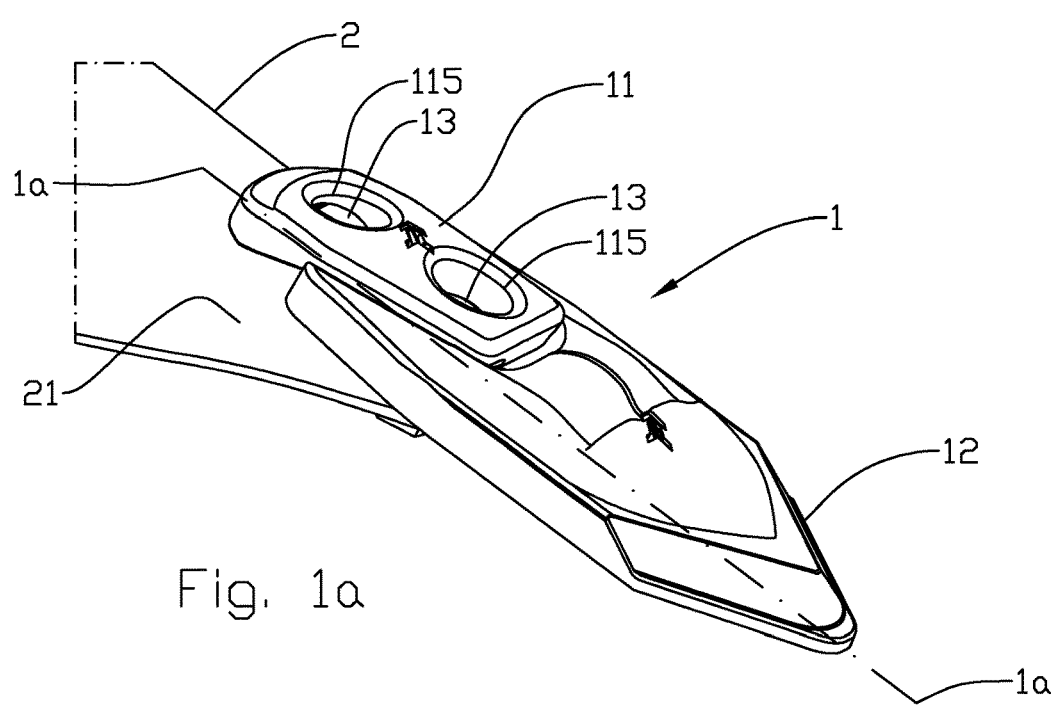
FIG. 1a depicts in larger scale the wearing-part arrangement of FIG. 1.

In FIGS. 1 and 1a, a wearing-part arrangement 1 is attached on a supporting surface 21 of an implement 2, typically on a plough share of a mouldboard plough as shown here, in order to protect a leading edge 211 of said implement 2 from excessive wear. A wearing-point holder 11, hereafter also called "holder", is attached to the supporting surface 21 by means of screws 13 extending through bolt holes 115 in the holder 11. A wearing part 12 is releasably attached to the holder 11 by means of a socket-and-pin quick-fit coupling. The wearing part 12 is forming a front portion of the wearing-part arrangement, and the wearing-part holder 11 is forming a rear portion of the wearing-part arrangement.

Figure 4:
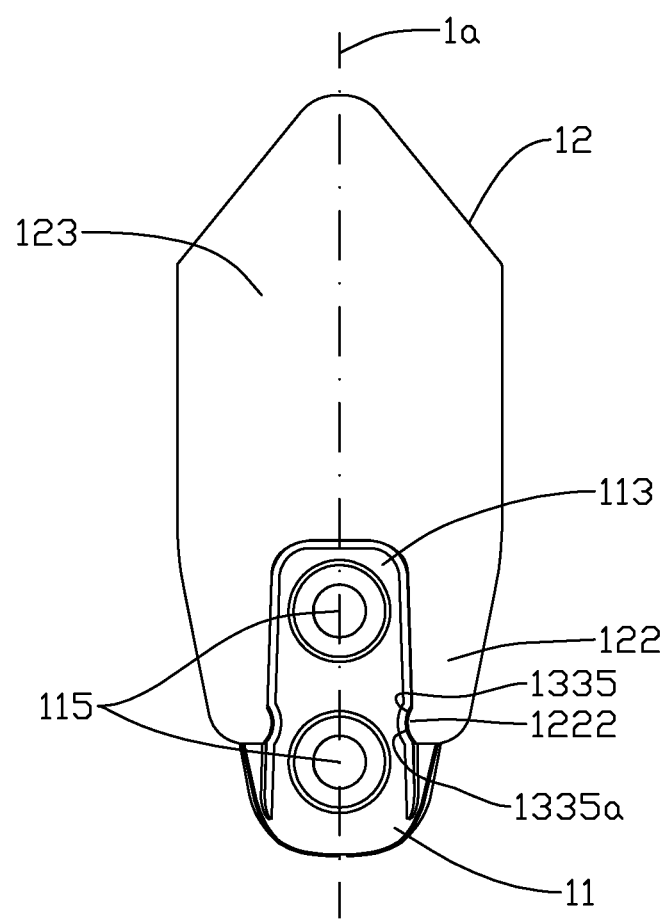
FIG. 4 depicts a bottom-up view the wearing-part socket in engagement with the holder pin.

A centre axis of the wearing-part arrangement 1 is indicated by the reference numeral 1a in FIGS. 1a and 4.

Figure 2:
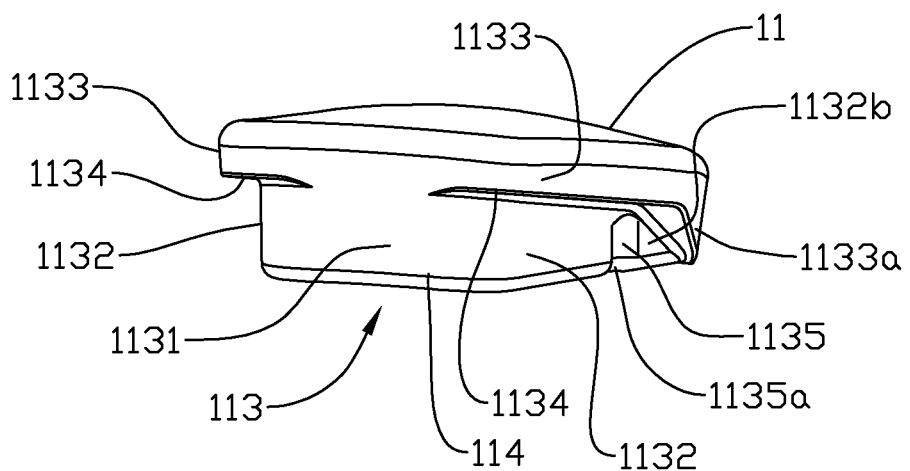
FIG. 2 depicts in larger scale a holder provided with a quick-fit coupling pin.
Figure 3:
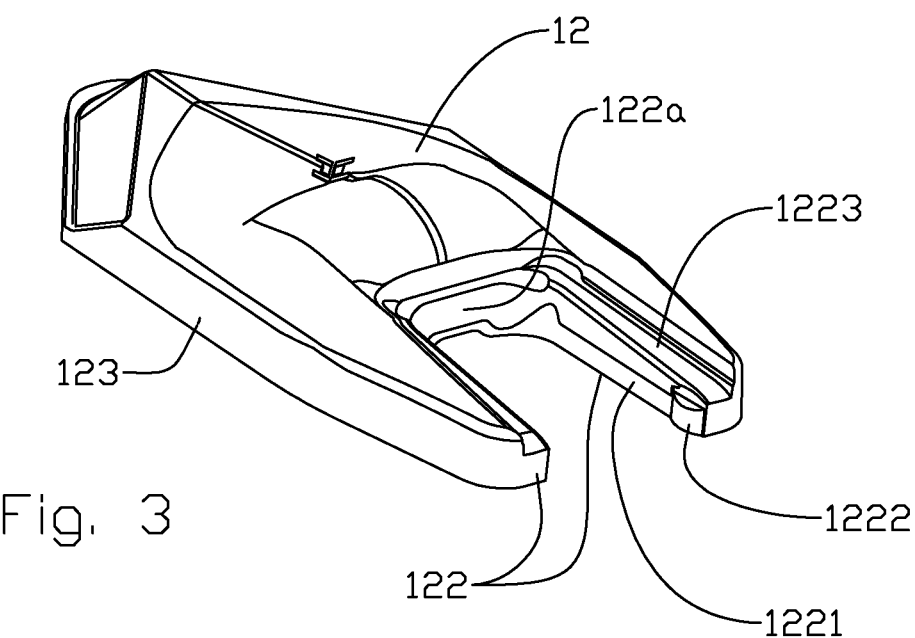
FIG. 3 depicts a wearing part provided with a quick-fit coupling socket.

It is referred to FIGS. 2, 3 and 4 for further details of the quick-fit coupling. In the depicted embodiment the holder 11 is provided with a pin 113 and the wearing part 12 is provided with a socket 122 configured to surround a tip portion 1131 of the pin 113 and at least adjacent portions of the neighbouring side faces 1132 of the pin 11.

The holder 11 is provided with a pair of first guide portions 1132 in the form of the holder side faces arranged parallel and at right angles at a bottom face 114 of the holder 11. From a top edge of the holder side faces 1132 holder top support faces 1134 are extending forming second guide portions, said holder top support faces 1134 facing the supporting surface 21 of the implement 2 and defining holder top support portions 1133. The depicted embodiment shows holder side faces 1132 with heights gradually decreasing towards rear end portions 1132b of the holder side faces 1132. Correspondingly, the thicknesses of the holder top support portions 1133 are gradually increasing towards said rear end portions 1132b. Rear transition portions 1133a of the top support portions 1133 are defining said rear end portions 1132b and the top support faces 1134, thereby shielding the holder side faces 1132 and corresponding wearing-part side supporting faces 1221 from intrusion of soil etc.

The wearing part 12 is provided with third guide portions 1221 in the form of wearing-part side supporting faces, the wearing-part side supporting faces 1221 being complementary to and arranged to slide along the holder side faces 1132 when the wearing part 12 is mating with the holder 11, abutting the holder side faces 1132 when the wearing part 12 is attached to the holder 11. Furthermore, from a top edge of the wearing-part side supporting faces 1221 wearing-part top faces 1223 are extending, forming fourth guide portions, said wearing-part top faces 1223 being complementary to and arranged to extend over the wearing part top faces 1223, sliding along the holder top support faces 1134 when the wearing part 12 is mating with the holder 11, abutting the holder top support faces 1134 when the wearing part 12 is attached to the holder 11.

When the wearing part 12 is located in its operative position on the implement 2, a wearing part bottom surface 123 is restingly abutting the supporting surface 21 of the implement 2.

Each of the holder side faces 1132 are provided with a recess 1135 arranged with an open end 1135a defined by the holder bottom surface 114. The recesses 1135 are arranged to receive corresponding elevations 1222 extending from the wearing-part side support faces 1121. In the depicted embodiment, the recesses 1135 and the elevations 1222 are located at the rear portions of the respective side support faces 1132, 1222 to allow the elevations 1222 to enter into engagement with the recesses 1135 without over-tensioning the socket 122.

Although the recesses 1135 in the exemplary embodiment are provided in the holder side faces 1132 and the corresponding elevations 1222 on the wearing-part side support faces 1121, the localization might be opposite and even arranged as a combination of recess 1135 and elevation 1222 on the holder 11 and corresponding elevation 1222 and recess 1135 on the wearing part 12.

The orientation of the holder side faces 1132 and the corresponding wearing-part side supporting faces 1221 might deviate from the shown embodiment, possibly by converging in a direction towards a bottom portion 122a of the socket 122 and/or diverging in the upward direction towards the holder top support faces 1134.

Even though the holder 11 in this embodiment is provided with the pin 113 and the wearing part 12 is provided with the socket 122, the scope of the invention is achievable also with a holder provided with a socket and a wearing part provided with a pin, provided that the top support portions 1133 and the top support faces 1134 are arranged on the holder 11, thereby providing vertical support to the wearing part 12.

Prior to attaching the holder 11 to the supporting face 21 of the implement 2, the wearing part 12 may be slid onto the holder 11 in a direction from below towards the bottom surface 114 of the holder 11. When replacing a worn-out wearing part 12, while maintaining the holder in position on the supporting face 21, the worn-out wearing part 12 is knocked off the holder 11 in a forward longitudinal direction of the holder 11, the knocking impact releasing the elevations 1222 from the recesses 1135. The new wearing part 12 is knocked onto the holder, the knocking impact causing the elevations 1222 engaging with the recesses 1135.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A wearing part arrangement comprising:
    a holder attachable to a supporting surface of an implement provided with a leading edge; and
    a wearing part for protecting the leading edge from excessive wear,
    wherein the holder provides releasable attachment of the wearing part by a socket-and-pin type quick-fit coupling,
    wherein the holder comprises
        a pair of opposing first guide portions providing lateral support to the wearing part, and being arranged to face corresponding supporting faces provided on the wearing part, and
        a pair of second guide portions facing the supporting surface and providing vertical support to the wearing part, the pair of second guide portions being arranged to face corresponding top faces of the wearing part,
    wherein
        one of the pair of the opposing first guide portions or the corresponding side supporting faces of the wearing part is provided with at least one elevation, and
        an other one of the pair of the opposing first guide portions or the corresponding side supporting faces is provided with a corresponding recess arranged for receipt of the elevation, the corresponding recess receiving the elevation when the wearing part is in engagement with the holder, and
    wherein the wearing part comprises a wearing part bottom surface for restingly abutting the supporting surface of the implement.

2. The wearing part arrangement according to claim 1, wherein the holder is forming an attachment pin, and the wearing part is forming a corresponding attachment socket configured to surround a tip portion of the pin and at least adjacent portions of neighbouring side faces of the pin.

3. The wearing part arrangement according to claim 1, wherein the first guide portions of the holder and the corresponding side supporting faces of the wearing part are provided with parallel longitudinal axes.

4. The wearing part arrangement according to claim 1, wherein the first guide portions of the holder and the corresponding side supporting faces of the wearing part are provided with parallel transversal axes.

5. The wearing part arrangement according to claim 1, wherein the first guide portions of the holder and the corresponding side supporting faces of the wearing part are provided with parallel transversal axes standing at right angles at bottom faces of the holder and the wearing part, respectively.

6. The wearing part arrangement according to claim 1, wherein the first guide portions are provided with a gradually decreasing height towards a rear end portion of first guide portions.

7. The wearing part arrangement according to claim 1, wherein a thickness of top support portions forming the second guide portions and extending from the first guide portions of the holder, is extending towards a rear end portion of first guide portions.

8. The wearing part arrangement according to claim 1, wherein the recess is provided with at least one open end arranged for allowing a corresponding elevation to enter said recess when slidingly moving the wearing part towards a holder bottom surface to engagement with the holder prior to attaching the wearing part arrangement to the supporting surface.

9. The wearing part arrangement according to claim 1, wherein the recess is provided at a rear end portion of a holder side face.

10. The wearing part arrangement according to claim 1, wherein the pin and the socket are mirror-symmetrical about a vertical plane coinciding with a center axis of the wearing part arrangement.

* * * * *